United States Patent [19]

Fujita et al.

[11] 4,125,850
[45] Nov. 14, 1978

[54] CAMERA ATTACHED WITH DEVICE FOR PREVENTING ERRONEOUS ACTIONS WHEN THE CAMERA IS NOT IN USE

[75] Inventors: Masami Fujita; Hirokazu Gunshi, both of Hachioji, Japan

[73] Assignee: Konishiroku Photo Industry Co., Ltd., Nihonbashi, Japan

[21] Appl. No.: 777,228

[22] Filed: Mar. 14, 1977

[30] Foreign Application Priority Data

Mar. 13, 1976 [JP] Japan .............................. 51-30181[U]
Mar. 13, 1976 [JP] Japan .............................. 51-30182[U]

[51] Int. Cl.² ............................................. G03B 17/42
[52] U.S. Cl. ................................. 354/204; 354/207; 354/268
[58] Field of Search ................... 354/204, 207, 268, 60

[56] References Cited

U.S. PATENT DOCUMENTS

| | | | |
|---|---|---|---|
| 3,611,900 | 10/1971 | Kitai | 354/207 |
| 3,693,524 | 9/1972 | Furuta | 354/268 X |
| 3,914,778 | 10/1975 | Sugiura | 354/268 |
| 4,038,672 | 7/1977 | Kondo et al. | 354/268 X |

*Primary Examiner*—Richard A. Wintercorn
*Attorney, Agent, or Firm*—Sughrue, Rothwell, Mion, Zinn and Macpeak

[57] ABSTRACT

The present invention relates to the improvement of a camera which comprises effecting the winding of film and the charging of a shutter with a winding lever which oscillates and having an electric device actuated by shutter release operation, and provides a camera equipped with a safety device in which when the winding lever is retracted and not in use, a release locking device for preventing re-release, after the shutter is released, operates and thereby shutter release under the retracted state is prevented. The camera is also equipped with a safety device in which a circuit to an electric source is opened with the above retraction so as not to actuate the electric device when the camera is not in use.

1 Claim, 6 Drawing Figures

CAMERA ATTACHED WITH DEVICE FOR PREVENTING ERRONEOUS ACTIONS WHEN THE CAMERA IS NOT IN USE

The present invention relates to the improvements of a camera comprising conducting the winding of film and the charging of a shutter with a winding lever making oscillating motion and having an electric device which is actuated by shutter release operation. The invention provides a camera equipped with a safety device in which when the winding lever is retracted and not in use, a release locking device for preventing re-release, after the shutter is released, is actuated and thereby shutter release under the retracted state is prevented. Also, the camera includes a safety device in which a circuit to an electric source is opened with the retraction and the accompanying electric device does not operate when the camera is not in use.

Various types of cameras have so far been proposed, which are equipped with a safety device for preventing shutter release operations when the camera is not in use by the utilization of the retracting behavior of a winding lever. Such a safety device is the one of exclusive use, which is actuated only by the retraction of a winding lever, and a camera equipped with such a safety device of exclusive use, makes an already complicated film winding-shutter-charging mechanism far more complicated.

Further, a camera is known, equipped with a circuit of an exposure meter using a battery as an electric source, in which an electric source switch of the exposure meter circuit is adapted to close or open with retraction of the winding lever. Some such cameras are equipped with such a comparatively simple retracting means as to interpose a type of friction clutch between a film winding axis (or spool axis) and a winding lever and carry out the pulling out and retracting movements of the lever by sliding this clutch, but there is the drawback that on account the returning inertia of the winding lever, the lever returns to the retracted state and opens the switch of an electric source in some cases. Others are equipped with a means of operating a switch for the electric source by interposing movement of an obstruction in the return path of a winding lever after the winding lever is pulled out to the starting position to prevent erroneous returning and there is the drawback that at the time of retracting the winding lever, the actions of removing the obstruction and rotating the lever should be carried out and consequently not only are they inconvenient to the operation but also one is apt to forget the retraction operation of the lever when one carries the camera nakedly and unnecessary consumption of battery current occurs.

The present invention provides a camera with an electric circuit of an electric exposure meter, electronic flash units, etc. which is equipped with a safety device having no drawback mentioned above in preventing shutter release operation with the retraction of the winding lever and further a safety device which opens an electrid source circuit in electric circuits accurately, when the camera is not in use is provided.

The first object of the present invention is to prevent the complication of film winding and shutter charging mechanisms by utilizing a shutter release locking device for preventing re-release as it is after the shutter is released and by permitting the shutter release locking device to be actuated also with the retraction of the winding lever, without providing an exclusive safety device.

Another object of the present invention is to accurately open and close an electric source circuit with no abovementioned drawback by providing the winding lever mechanism equipped with the shutter release locking mechanism mentioned in the first object above with a mechanism for preventing the winding lever from returning to the retracted state by return inertia.

The present invention will be described below with reference to the accompanying drawings.

DESCRIPTION OF A PREFERRED EMBODIMENT

Figure 1:
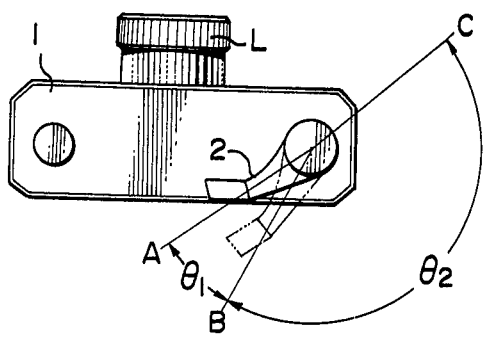
FIG. 1 is a schematic plan of a camera showing the rotating positions of a winding lever.

In FIG. 1, 1 is a camera body or housing; 2 is a winding lever. Winding lever 2 is pivoted to take retracting position A, wind-starting position B and wind-completing position C; and rotary angles between A and B and that between B and C are, respectively, $\theta_1$ and $\theta_2$. The structures of retracting of winding lever 2 and pulling of it out to B are the ones which maintain the retracting position with friction or click stop of a well-known type. L is a lens.

Figure 2:
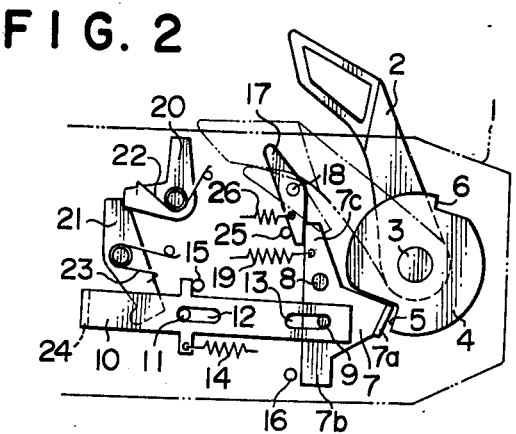
FIG. 2 is a schematic bottom view of a camera showing the state of a release locking device after the completion of film winding.

In FIG. 2, 3 is an axis of a winding lever; 4 is a winding stopper adapted to revolve while being integrated or interlocked with winding lever 2, which winding stopper has deep notch 5 and shallow notch 6 on its periphery, diametrically opposite to each other. 7 is a locking member rotatably mounted on camera body 1 with fulcrum 8 so that a first arm 7a engages with both of notches 5 and 6, and the locking member is equipped with engagement pin 9. Then a second arm 7b is relatively positioned and formed so that it can thrust within the manuevering range, release lever 16 which is described later, and a third arm 7c is formed so as to engage with safety member 17 which is described below. This locking member 7 is biased by spring means 19 so that it can always rotate counterclockwise. 10 is a transmitting member having guide slit 12 to which pin 11 mounted on the camera body is fitted and engagement slit 13, to which engagement pin 9 of the locking member is fitted and being thereby made movable from left to right and vice versa, and at its left end is formed with a bent portion 24. 14 is a spring means biasing to the right, said transmitting member 10, and 15 is a stopper for determining the right-movement restricting position of transmitting member 10, and determines via engagement pin 9 a position also in which first arm 7a of the abovementioned locking member 7 engages with deep notch 5 of stopper 4. 16 is a release lever displaceable perpendicularly to the surface of the paper in the drawing. 17 is a safety member rotatably disposed by fulcrum 18, whose tip is adapted to press third arm 7c of locking member 7 when it is rotated counterclockwise. Usually, this safety member is pulled clockwise by weak spring means 26 and restrained by stopper 25. 20 is a hook, which is rotated clockwise by a signal of exposure completion or the returning movement of an automatic aperture control lever (not shown) after the shutter operates and the exposure is completed, and it is always biased counter-clockwise by spring means 22. 21 is a returning member biased with hook 20 and energized clockwise by spring means 23. When hook 20 is disengaged from returning member 21, the arm of returning member 21 is arranged to press against bent portion 24 of transmitting member 10 and displace it to the left forcibly by the force of spring means 23. Returning member 21 has a known means (not shown) for rotating it counterclockwise, interlocked with the winding operation and being returned to the state in which it engages with hook 20 by the winding operation.

Figure 5:
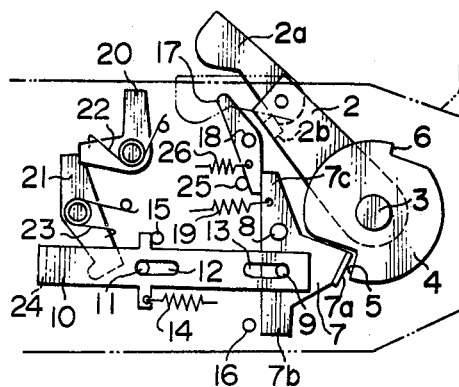
FIG. 5 is a schematic bottom view of a camera showing the same state as in FIG. 2 except that a winding lever has a tip of folding structure.

In FIG. 5, winding lever 2 is one whose tip 2a is of a folding structure and protrusion 2b mounted on winding lever 2 controls the position of pull out of tip 2a.

Figure 6:
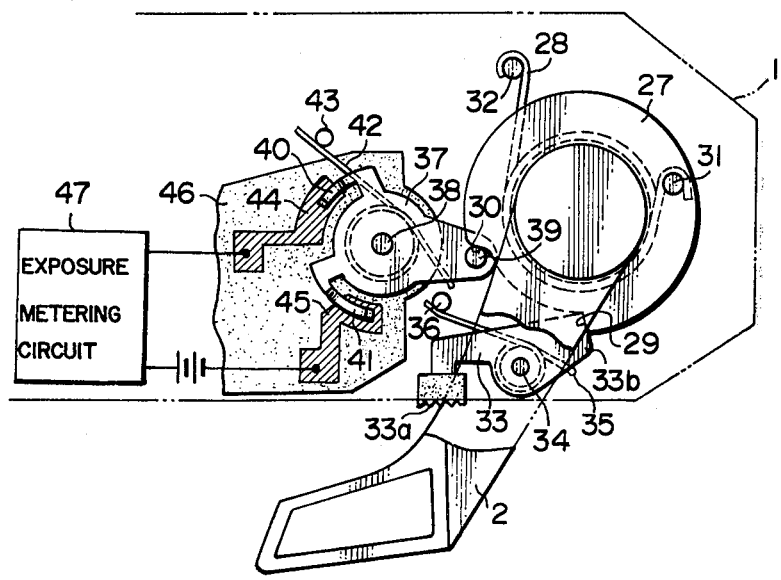
FIG. 6 is a schematic plan view showing the state of mechanism of opening and closing an electric source circuit when a winding lever is in the wind-starting position.

In FIG. 6, 27 is a control board integrated with winding lever 2 and is always biased clockwise (direction in which the winding lever is retracted) with first spring means 28. This control board may be adapted to be interlocked with winding lever 2 by the utilization of an appropriate transmitting member. 29 and 30 are respectively a return prevention portion and a cam portion formed on control board 27. Of course, return prevention portion 29 and cam portion 30 may be formed on not only the outer peripheral face but also the inner peripheral face or the end face of control board 27. 31 is a pin on which to hang a spring built in control board 27, and 32, 36 and 43, the latter two of which are described later are, respectively, pins on which to hang springs, secured to the camera body; 33 is a stopper member rotatably pivoted on fulcrum 34 and always biased counter clockwise by second spring means 35. Push button 33a formed at one end of said stopper member 33 is, for instance, disposed to be exposed to the extent that it protrudes slightly from the back of the camera, and preventive portion 33b is adapted to engage return prevention portion 29 of control board 27 by the force of the second spring means 35 in a position on the control board corresponding to the wind-starting position of winding lever 2.

37 is a movable terminal or contact rotatably pivoted on fulcrum 38, and in the first arm protruding to the outer periphery there is mounted engagement pin 39 capable of engaging with cam portion 30 of control board 27. On the second and third arms there are, respectively, mounted elastic metal plates 40 and 41. Both metal plates 40 and 41 are electrically coupled with each other, for instance, by an appropriate means as illustrated in FIG. 6.

Further, movable terminal 37 is always biased counterclockwise by third spring means 42.

44 and 45 are stationary terminals or contacts formed on insulating base 46, and first stationary terminal 44 is a terminal constituting what is called a slip ring. Thus, the length of this stationary terminal 44 is preliminarily set to such a value as to keep electric contact between stationary terminal 44 and one metal plate 40, of movable terminal 37 even if movable terminal 37 has been rotated (including followed) relative to control board 27 which rotates in a range corresponding to the total rotary range $\theta_1 + \theta_2$ of winding lever 2 from retracting position A to wind-completing position C, as shown in FIG. 1.

Metal plates 40 and 41 of movable terminal 37 and stationary terminals 44 and 45 cooperate to constitute an electric source switch for an electric circuit installed within the camera such as exposure metering circuit 47. In this case, there are considered, as electric circuits, electric shutter circuits, flash discharge lamp circuits, flash synchronization circuits, various warning circuits, various detecting circuits, etc. and as switches, a safety switch, etc. However, these are to be appropriately selected in the stage of design according to the object.

Operations of each device above will be described below.

FIG. 2 shows a release erroneous operation prevention device in the state of winding completion in which the shutter can be actuated any time by rotating release lever 16.

That is, since in this state, locking member 7 stays in a position determined by engagement slit 13 of transmitting member 10 and its second arm 7b remains outside the maneuvering range or path of movement of release lever 16, release lever 16 can be freely pressed. At the same time, as first arm 7a of locking member 7 engages with deep notch 5 of winding stopper 4, winding lever 2 is prevented from subsequent winding operations.

Figure 3:
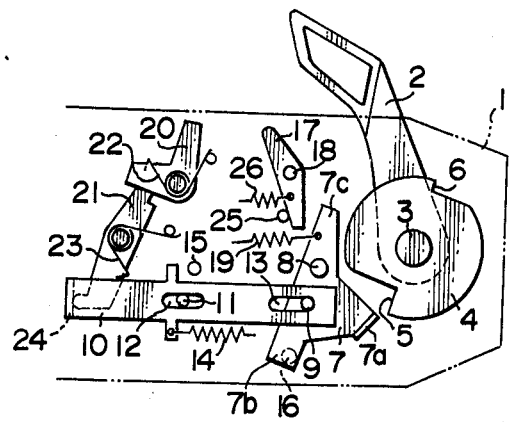
FIG. 3 is a schematic bottom view of a camera showing the state of a release locking device before rewinding of film is carried out with a winding lever after the termination of shutter release operation.

If release lever 16 is rotated to complete exposure, returning actions of shutter operating mechanism and an automatic aperture control lever rotate hook 20 clockwise to disengage hook 20 from returning member 21, and hence, returning member 21 rotates clockwise by the force of its spring means 23 and strikes bent portion 24 of transmitting member 10 to displace forcibly, to the left, transmitting member 10 against the force of its spring means 14. As at this time, the right end of engagement slit 13 of transmitting member 10 is caused to pull engagement pin 9 to the left, locking member 7 rotates clockwise and as shown in FIG. 3, its first arm 7a is disengaged from deep notch 5 of winding stopper 4 and its second arm 7b is thrust into the maneuvering range or path of release lever 16. Since in this state it becomes impossible to press down release lever 16 again, multi-exposures can be prevented and subsequent winding operations of winding lever 2 become possible.

Figure 4:
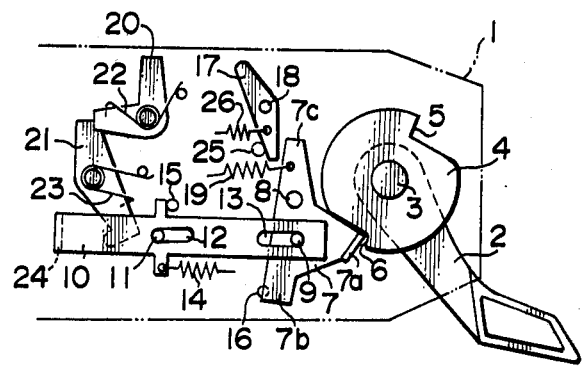
FIG. 4 is a schemcatic bottom view of a camera showing the state of a release locking device when a winding lever has been rotated in full.

Since this state in FIG. 3 is a state in which photographing is over — that is, a state before winding up of film, the film, for subsequent photographing, should be again wound and shutter charging should be effected. Therefore, as shown in FIG. 4, if winding lever 2 is rotated about 180°, winding stopper 4 rotates accordingly, and returning member 21 rotates counterclockwise in a predetermined amount by an interlocking mechanism of a well-known type (not shown) and hook 20 engages it to place returning member 21 into the set state.

By this, transmitting member 10 displaces to the right by the force of spring means 14 to a position in which it is restricted by stopper 15 to place locking member 7 into the state in which it is possible for it to return to the position shown in FIG. 2. Thus, first arm 7a of locking member 7 engages the outer periphery of winding stopper 4 and falls into shallow notch 6 of winding stopper 4 to restrict winding operations, FIG. 4. Then, if winding lever 2 is returned to its starting position in the same manner as in the well-known cases, all the related positions return to the state shown in FIG. 2.

When the desired photographing is finished, if winding lever 2 or tip 2a of winding lever 2 is, respectively, retracted to the double dot lined positions in FIG. 2 or FIG. 5, those inner sides rotate safety member 17 counterclockwise and displace locking member 7 into the position shown in FIG. 3. Hence, release lever 16 is placed in a state in which it is impossible to again press down release lever 16.

The operations of an opening and closing device for an electric source circuit shown in FIG. 6 will be described below.

When winding lever 2 stays in retracting position A in FIG. 1, cam portion 30 of control board 27 is displaced from the position in FIG. 6 clockwise by an angle corresponding to angle the of retraction $\theta_1$, and movable terminal 37 also rotates counterclockwise by the force of third spring means 42 to open electric contact between the other metal plate 41, of movable terminal 37 and second stationary terminal 45.

If winding lever 2 is pulled out from its retracting position A to wind-starting position B, cam portion 30 of control board 27 rotates movable terminal 37 to the position shown in FIG. 5 via engagement pin 39 and the other plate 41, of movable terminal 37 rides on second stationary terminal 45 and completes electric contact therewith.

At this time, the preventive portion 33b of stopper member 33, which has so far engaged the outer periphery of control board 27 falls into a small diameter path of control board 27 by the force of second spring means 35 at the position of return prevention portion 29 of control board 27 and prevents winding lever 2 from returning to retracting position A. If in this state winding lever 2 is caused to make oscillating motions in the range of wind-starting position B and wind-completing position C, operations of film winding and shutter charge can be conducted in the same manner as in those of a well-known type, but since during that time, movable terminal 37 is rendered immovable, the closed state of the electric source circuit is maintained.

Now, by depression of push button 33a of stopper member 33 after the termination of photographing, said stopper member rotates clockwise to cancel the prevention state of control board 27, and thus, control board 27 (that is, winding lever 2) is caused to quickly return to retracting position A by the force of first spring means 28.

As described above, when the release erroneous operation prevention device of the present invention is in use, film winding restriction and non-workability of a shutter release, when the camera is not in use, can all be satisfied by the addition of the fewest members and materials and the camera with this device becomes very convenient for practical use.

If a switch device of the abovementioned electric circuit besides the release erroneous operation prevention device is in use, not only is an erroneous return of the winding lever to the retracting position prevented, but also, when the winding lever requires to be retracted with the termination of photographing, it can be carried out by a simple operation of the push button of the stopper member. It is very convenient for practical use. And if a switch device of an electric circuit is used as in the embodiment in FIG. 6, there is the advantage that the energizing direction of third spring means 42 agrees with that of first spring means 28 and therefore the force of first spring means 28 can be made small to that extent, load at the time of film winding can be made small.

Further, it goes without saying that the present invention is applicable to not only the winding lever of a rotary type but also that of a linear type and other interlocking types.

What is claimed is:

1. A camera having a housing, a film transport handle mounted to said housing for oscillatory movement from a retracting position through a wind-starting position to a wind-completing position through which the transportation of one frame of the film can be effected by one complete oscillatory motion, a shutter release lever carried by said housing for axial movement along its longitudinal axis for actuating the camera shutter device, an electric device operated by said shutter device, said camera further comprising a winding stopper integral with said film transport handle and rotatable therewith and having a notch at a position corresponding to the wind-starting position of the film transport handle, a control board integral with the film transport handle and rotatable therewith, first spring means for biasing said control board to rotate along with said handle and said stopper in a direction towards said retracting position and having a return prevention portion for preventing rotation of said control board by said first spring means at the wind-starting position of the film transport handle and also having a cam portion for controlling the opening and closing of the electric source circuit of said electric device, a locking member rotatably mounted to said housing and having a first arm, a second arm, a third arm and an engagement pin, a second spring means for biasing said locking member so as to cause said first arm to engage said winding stopper notch to block the rotation of the film transport handle in a direction towards said wind-completion position and with said second arm being displaced from a position in alignment with said shutter release lever, thereby permitting axial movement of said shutter release lever, a safety member pivotably mounted to one side of said locking member, a third spring means for biasing said safety member into contact with said third arm for displacing said second arm to a position blocking said shutter release lever and preventing axial movement thereof, said safety member being rotatable against its spring bias by the film transport handle when said handle is moved to retracting position to cause rotation of said locking member against the bias of said second spring means, a longitudinally movable transmitting member including an engagement slit, an engagement pin carried by said locking member and received within said engagement slit, fourth spring means for biasing said transmitting member in a direction tending to maintain said locking member first arm within said winding stopper notch, said transmitting member being mounted to said camera housing such that when the shutter device comes into operation by the depression of the shutter release lever axially, said transmitting member is displaced against the bias of the fourth spring means to cause the engagement slit to engage the engagement pin to rotate the locking member in opposition to its spring bias to release said first arm from said notch of said stopper, and that when the film transport is completed by the rotation of the film transport handle, said transmitting member is displaced in the opposite direction by the biasing force of said fourth means to release said engagement pin; a control board mounted to said handle for rotation therewith, a control board stopper member having a preventive portion and being pivotably mounted adjacent said control board, fifth spring means for biasing said control board stopper member to a position such that the preventive portion engages the return preventive portion of said control board to prevent the film transport handle from returning to retracting position, a push button carried by said control board stopper member and depressible for rotating said control board stopper member against its bias to thereby disengage the preventive portion of said control board stopper member from the return prevention portion of said control board, a switching member having a movable terminal being mounted for rotation about its axis, sixth spring means for biasing said switching member into engagement with a cam portion of said control board and being rotatable by said cam portion such that the electric source current of the electric device may be open when the film transport handle is in a position within the range from said retracting position to said wind-starting position, and wherein the electric source circuit may be closed when the film transport handle remains within the range from the wind-starting position to the wind-completing position, such that double film exposure is precluded by prevention of consecutive axial movements of said shutter release lever except upon movement of the film one frame position by complete oscillatory rotation of the film transport handle, and wherein consecutive oscillatirns of the film transport handle to effect double wind-completing operation is prevented absent operation of the shutter device.

* * * * *